(No Model.)

C. T. E. CLAUSEN.
APPARATUS FOR DETERMINING, CORRECTING, OR COMPENSATING COMPASS DEVIATIONS.

No. 517,029.　　　　　　　　　　Patented Mar. 27, 1894.

Witnesses:　　　　　　　　　　Inventor:
H. G. Dieterich　　　　　　　　Carl T. E. Clausen
Henry Orth　　　　　　　　　　By Henry Orth, Atty.

THE NATIONAL LITHOGRAPHING COMPANY,
WASHINGTON, D. C.

UNITED STATES PATENT OFFICE.

CARL THEODOR EMIL CLAUSEN, OF COPENHAGEN, DENMARK.

APPARATUS FOR DETERMINING, CORRECTING, OR COMPENSATING COMPASS DEVIATIONS.

SPECIFICATION forming part of Letters Patent No. 517,029, dated March 27, 1894.

Application filed May 17, 1893. Serial No. 474,589. (No model.)

*To all whom it may concern:*

Be it known that I, CARL THEODOR EMIL CLAUSEN, a subject of the King of Denmark, residing at Copenhagen, in the Kingdom of Denmark, have invented certain new and useful Improvements in Apparatus for Determining, Correcting, or Compensating Compass Deviations; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

At the present day when rapid transit and safe navigation are of vital consequence, the provision of means for compensating, that is to say, correcting or determining compass deviations without loss of time, is of vital importance. Instruments for this purpose have heretofore been proposed whereby these corrections could be made without taking terrestrial or astronomical bearings. Those instruments have, however, proven unavailable owing to the difficulties encountered in their use, and the unreliable results obtained, the operations being based upon the direct measurement of the disturbing forces so that these corrections continue to be made by the use of terrestrial or astronomical bearings, which involves considerable time, and which cannot be taken in foggy or cloudy weather.

My invention has for its object the provision of means whereby compass deviations may be determined and corrected substantially at all times without resorting to terrestrial or astronomical bearing points, the operation being based upon the determination of the resultant of the perturbing forces as indicated by the reading of a deflection.

Figure 1:
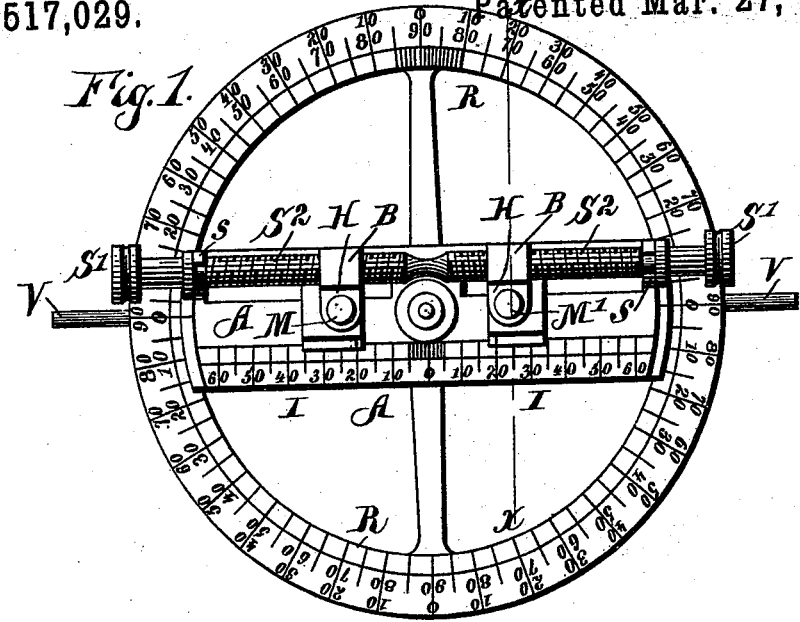
Figure 2:
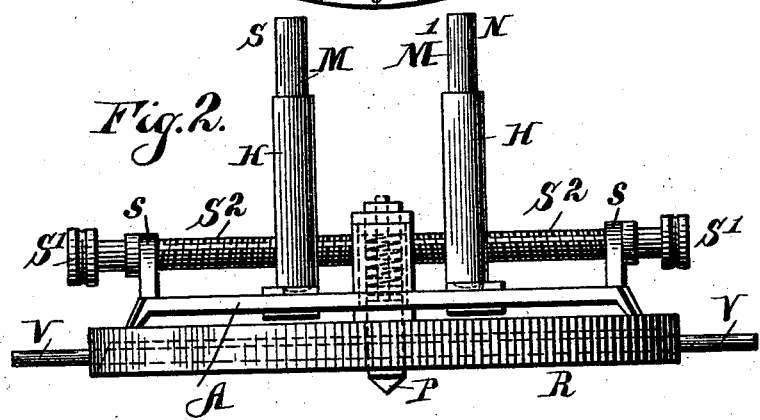
Figure 3:
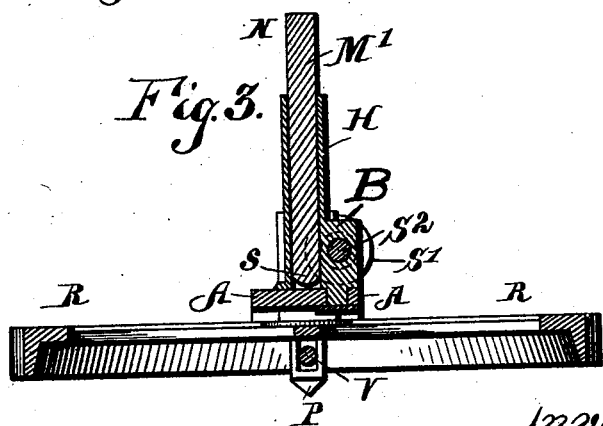

Referring to the accompanying drawings—Figure 1 is a top plan view, and Fig. 2 an elevation of the instrument forming the subject-matter of this invention, and Fig. 3 is a cross section taken on line $x$—$x$ of Fig. 1.

The instrument consists of a graduated circle or ring R, that has a central pivot P adapted to seat in a conical bearing formed centrally in the glass cover of the compass bowl; of a rule A, and two magnets M, M', reciprocally adjustable above the rule by means of a right and left hand threaded screw $S^2$ provided with a suitable knob $S'$ at each end for purposes of manipulation, said rule having along one edge in front of the magnets a graduated scale I. The screw $S^2$ has its bearings in standards $s$ projecting from rule A, while the magnets M and M' are held in suitable holders H that are secured to sliding blocks B having an interiorly threaded opening, the opening in the slide block of one of the magnets having a right hand thread, and the opening in the slide block of the other magnet having a left hand thread for the correspondingly threaded portions of the screw $S^2$.

The magnets M and M' are so arranged as to present unlike poles to each other and to the rule A and in order to readily distinguish the said unlike poles the holders H hereinbefore referred to are preferably painted in different colors, as red and blue, and the rule A on one side of zero may be painted to correspond with the color of one of the magnet holders, as blue. The rule A is revoluble about the axial pivot P of the graduated ring R, and the pointer V arranged in the diametrical axial plane of said ring serves to position the latter, said pointer being secured in pivot P, as shown in Fig. 3.

My improved instrument may be used under all circumstances, provided the pitching or rolling of the vessel is not too violent, and the following data can be obtained without taking either terrestrial or astronomical bearings. First. Compensation of the semi-circular as well as the quadrantal errors of the compass. Second. The determination of the deviation of the compass needle whatever course the ship may be on. Furthermore, when the quadrantal error is already compensated, it may, without taking bearings be used for, third, controlling the position of the corrector magnets by putting the ship on two different compass courses. Fourth. Controlling the deviation on the course steered by compass and reconstructing the table of deviation by a single change of course. If the quadrantal error is already compensated and the magnetic course be known—for, fifth, controlling the compensation of the semi-circular error while keeping the ship to her course, therefore also, applying the corrector magnets when the vessel is lying at her dock or riding at anchor.

I will now briefly describe the normal or approximately normal adjustment of the instrument and its uses.

*Normal adjustment.*—The instrument is in normal adjustment whenever the distance between the two magnets M and M' is such that when the instrument is placed on the compass their magnetic action on the needle will equal that of the horizontal component of terrestrial magnetism. This normal adjustment may be correct or approximate. When the instrument is used on board of wooden ships, a correct normal adjustment can be effected on shore, and under such conditions that the compass needle will not be influenced by the presence of other than terrestrial magnetic forces, which would not be the case if comparatively large masses of iron were present, the compass being placed so that the lubber line will point to the north. The instrument is then set on the glass cover of the compass and the rule A slowly turned until it is perpendicular to the magnetic meridian, and finally the compass card being at rest, its deflection is made equal to forty-six degrees by moving the magnets M and M' to or from each other, as the case may be, by means of the screw $S^2$. When, on the contrary, the instrument is to be used on iron ships, the deflection is determined by tan. $U = \dfrac{\lambda H}{H}$, H indicating the horizontal component of the terrestrial force on shore, and $\lambda H$ the same force on board ship in the position of the compass, and U the deflection sought. If $\lambda$ is not known it is supposed to be 0.9, so that the deflection will have to be forty-two degrees, in which case the normal adjustment will only be approximate. Such an adjustment can be effected on board at all times by making the deflection of the steered course $U^s$ equal forty-five degrees, then swinging the ship into an opposite course and finding the deflection $U^{cp}$ without altering the adjustment of the instrument and making this last deflection equal one-half (forty-five degrees plus $U^{op}$) by adjustment of the magnets M, M'. The exact normal adjustment of the instrument may be effected on board of iron vessels after completing the compensation of the compass by adjusting the magnets M and M' so that the deflection of the compass needle will equal forty-five degrees on any course steered. If the relative position of the magnets M, M' corresponding to a deflection of the compass needle of forty-five degrees on shore in the same place is known, $\lambda$, may then be determined. In latitudes in which the magnetism is variable or shifting the distance between the magnets M M' will have to be increased or diminished in proportion to the increase or decrease in the horizontal terrestrial magnetic force and this can be effected on board ship as follows: The deflection $U^s$ on the steered course is determined by the instrument in its original adjustment, then by shifting the magnets M, M', until said deflection is reduced to the value X determined by the formula tan. $X = \dfrac{H'}{H} \tan. U^s$, in which H indicates the original and H' the present horizontal terrestrial magnetic force. The values of H and H' may be obtained from a chart of horizontal intensities. On the other hand, if desired, a table of the reciprocal distances of the magnets M and M' may be prepared on shore by the use of the formula $U = \dfrac{\lambda H'}{H}$, in which H indicates the horizontal terrestrial magnetic force of the locality, and H' that of the same force at various other localities.

*Mode of using instrument.*—The magnetic forces acting on the compass needle are the horizontal component of terrestrial magnetism plus the horizontal component of the vessel's magnetism, the needle being influenced by the resultant of these forces, and will consequently point in different directions whenever the vessel's course is changed. Where the instrument is in its normal adjustment so that the magnetic influence of the magnets M and M' will be equal to that of the horizontal component of the terrestrial magnetic force, the needle will be deflected forty-five degrees whenever the rule A is placed perpendicular to the direction of said needle as above set forth, but this deflection will vary in proportion to the influence of the horizontal component of the ship's magnetic forces if such forces are present. The purpose of the instrument forming the subject matter of my invention being, as hereinbefore stated, to measure the deflection of the compass needle on the various courses a ship may take when the rule A is placed perpendicular to the direction of said needle, and as said needle is deflected the moment the instrument is placed on the compass to be corrected and the rule A set perpendicular to said needle the ship must be kept to her course by an auxiliary compass, *i. e.*, another of the ship's compasses, from which such course may be read. The instrument is then placed on the compass to be corrected as described, with the pointer V in the plane of the fore and aft line of the vessel, and the colored part of the rule A above or over the north of the compass card. The rule is now slowly turned ninety degrees or perpendicular to its original position or direction. Under the influence of the magnets M and M' the compass needle will of course be deflected, and by a little skill immobilized, when the deflection can be read on the ring R, the ship being meanwhile kept steadily to her course by the auxiliary compass.

COMPENSATION OF THE COMPASS AND DETERMINATION OF THE DEVIATION WITHOUT BEARINGS.

*Compensation of the compass.*—The deflector in approximate normal adjustment, the cardinal and intermediate point deflections as N. N.E., E., &c., are indicated by $U^0$ $U^4$ $U^8$, &c., those on a course eight points to the right or left of a ship's course by $U^r$ and $U'$ respectively, and on an opposite course by $U^{op}$.

*Compensation of the compass, the deflector in approximate normal adjustment.*—The ship being put on a north course by compass and the instrument set on the latter as described, determine $U^0$ (read on exact course) move compass card back to normal position and to rest and remove the instrument. Swing ship to east, position instrument and find $U^8$ in same manner, move compass card back to normal position and to rest, remove instrument and then swing ship to south and determine $U^{16}$. The rule A being maintained in its position athwart the ship, adjust the fore and aft corrector magnet so as to make the deflection equal one-half $(U^0+U^{16})$, move compass card back and to rest and remove instrument. Finally, head the ship due west and determine $U^{24}$ and adjust athwart ship corrector magnet so as to make the deflection of compass needle equal one-half $(U^8+U^{24})$. If one-half $(U^8+U^{24})$ exceeds one-half $(U^0+U^{16})$ there must be a quadrantal error which may be corrected by a proper adjustment athwart ship of iron balls for the purpose of compensating the ship's permanent magnetism as is usual until the two values are equal, while the ship is held to an E. or W. course. If, on the contrary, one-half $(U^0+U^{16})$ is greater than one-half $(U^8+U^{24})$ the iron spheres will have to be applied in the fore and aft plane while the ship is held to a N. or S. course.

*Note.*—If the value $U^0-U^{16}$ or $U^8-U^{24}$ exceeds ten degrees the operation must be repeated in order to correct the adjustment of the corrector magnets before the spheres are applied. Furthermore, the ship may be put to the different courses referred to in whatever order desired or found most convenient.

*Determination of the deviation. The deflector in approximate normal adjustment.*—The ship is successively put on a N. NE. E., &c., course, find the corresponding deflections $U^0$, $U^4$, $U^8$, &c., and determine the coefficients from $B=U^{16}-U^0$; $C=U^8-U^{24}$; $D=\frac{1}{2}(U^8+U^{24})-\frac{1}{2}(U^0+U^{16})$ and $E=\frac{1}{2}(U^4+U^{20})-\frac{1}{2}(U^{12}+U^{28})$. After which the formula $$\delta = A + B \sin. \zeta + C \cos. \zeta + D \sin. 2\zeta + E \cos. 2\zeta$$

is used for the compensation of the table of deviation, supposing the coefficient A to be zero if its value is unknown; $\zeta$ signifies the compass course. On the other hand if E is supposed to be zero, or its value is known, it will be sufficient to determine the value of $U^0$ $U^8$ $U^{16}$ $U^{24}$ to compute B C and D. Finally, if B and C do not exceed ten degrees and D does not exceed five degrees, the ascertained deviation may be considered correct within one degree.

*Control of the compensation and deviation without bearings. Control of the position of the corrector magnets by two changes of course only, the quadrantal error already compensated and the instrument in exact normal adjustment.*—The ship is put to a N. or S. course by compass, instrument placed on compass glass and rule R adjusted athwart ship, and then the fore and aft corrector magnet is adjusted until $U^0$ equals forty-five degrees. The compass card is now brought back and to rest. Swing ship to an E. and W. course, apply the instrument and adjust the rule fore and aft, then adjust the athwart ship corrector magnet until $U^8$ equals forty-five degrees, and bring the card back and to rest and remove the instrument.

*Control of the deviation, one change of course, the quadrantal error having already been compensated.*—Swing ship's head eight points to the right or left of the steered course and find $U^r$ or $U'$, then bring ship back to its original course and compute the deviation on the steered course from $\delta^s=2$ ($U^r$ minus forty-five degrees) or $\delta^s=2$ (forty-five degrees minus $U'$), the deflection $U^s$ corresponding to the steered course, being determined, the deviation on the course eight points to the right will be $\delta^r=2$ (forty-five degrees minus $U^s$) or on a course eight points to the left $\delta'=2$ ($U^s$ minus forty-five degrees), after which the table of deviation may be reconstructed graphically after the manner of Mr. Jaffré. On the other hand, the deflections $U^s$ and $U^{op}$ on the steered and the opposite course having been determined $\delta^r=U^{op}-U^s$ may be computed, and the table of deviations reconstructed.

*Control of the compensation and deviation without change of course. Control of the position of the corrector magnets. The quadrantal error already compensated, the instrument in exact normal adjustment and the magnetic course determined from bearings.*—Find correct magnetic course and keep ship steadily to it, place instrument on glass of compass and adjust the graduated rule as many degrees from the lubber line as is the magnetic N. point, but to the opposite side. Then adjust the athwart ship corrector magnet until the compass needle is in a correct fore and aft position, again turn the rule one hundred and eighty degrees through the N. and, the card being quiet, adjust the fore and aft corrector magnet until the position of the compass needle is exactly athwart ship. The compass card is then brought back and to rest and the instrument removed. In order to obtain good results the course of the ship should rather not be nearer than one point to the magnetic N. S. E. or W.

*Control of the deviation, the quadrantal error already compensated, the instrument in exact normal adjustment and the magnetic course known from bearings.*—Keep the vessel's course steady, position the instrument and find $U^s$. The deviation on a course eight points to the right of the steered course is then computed from $\delta^r=2$ (forty-five degrees minus $U^s$). The deviation $\delta^s$ on the steered course being known from bearings, the table of deviation may be reconstructed. Without any change of course, hence without loss of time, the table of deviations may in this manner be controlled as often as bearings of a terrestrial or astronomical point with known azimuth can be had.

Having thus described my invention, what I claim as new therein, and desire to secure by Letters Patent, is—

1. An instrument of the class described comprising a suitably graduated ring, provided with an axial pivot, a suitably graduated rule arranged with its opposite ends proximate to the graduations of the ring and adapted to revolve about the axial pivot of the latter, and a pair of magnets reciprocally adjustable along the rule, for the purpose set forth.

2. An instrument of the class described comprising a suitably graduated ring, provided with an axial pivot, a suitably graduated rule arranged with its opposite ends proximate to the graduations of the ring and adapted to revolve about the axial pivot of the latter, and a pair of magnets reciprocally adjustable along the rule, said magnets arranged to present unlike poles to each other and to the rule, for the purpose set forth.

3. An instrument of the class described comprising a suitably graduated ring provided with an axial pivot, a suitably graduated rule arranged with its opposite ends proximate to the graduations of the ring and adapted to revolve about the axial pivot of the latter, and a pair of magnets one on each side of the axis of rotation of the rule, said magnets reciprocally adjustable along said rule and arranged to present unlike poles to each other and to the rule, for the purpose set forth.

4. The combination with a mariner's compass provided in its glass cover with a bearing in the vertical plane of the axis of motion of the needle, of means for determining the deviations of said needle, comprising a suitably graduated ring provided with an axial pivot adapted to revolve in said bearing, a suitably graduated rule arranged with its opposite ends proximate to the graduations of the ring and adapted to revolve about said pivot, two magnets supported from the rule on opposite sides of its axis of motion, said magnets presenting unlike poles to the rule, and means for adjusting the said magnets in a radial direction along the graduations of the rule, substantially as and for the purpose set forth.

In testimony whereof I have hereunto signed my name to this specification in presence of two subscribing witnesses.

CARL THEODOR EMIL CLAUSEN.

Witnesses:
VIGO EMILIUS THEOPHILIUS CLAUSEN,
ALEXIS KÖHL.